(No Model.)
W. R. BOERNER.
Air Compressor.
No. 239,310. Patented March 29, 1881.
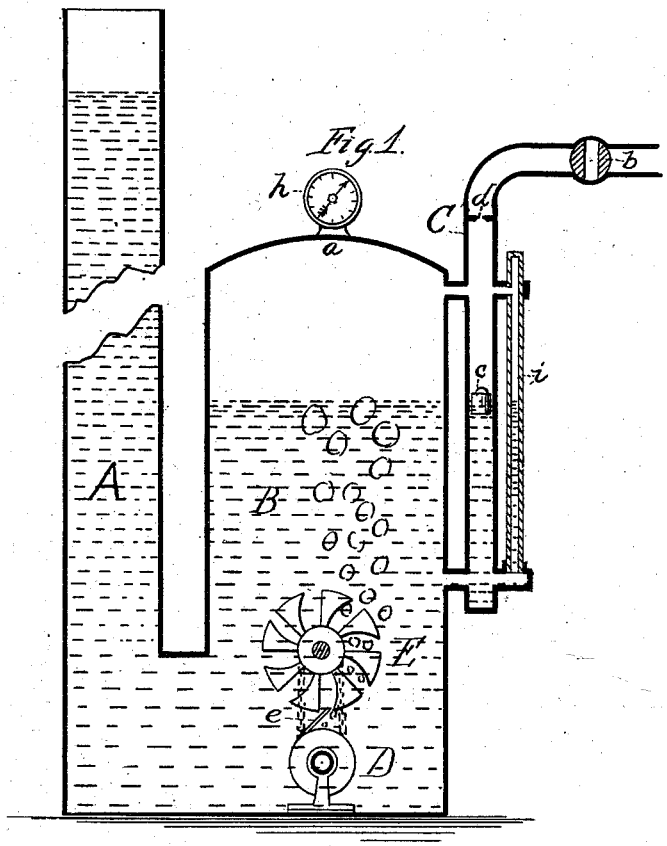
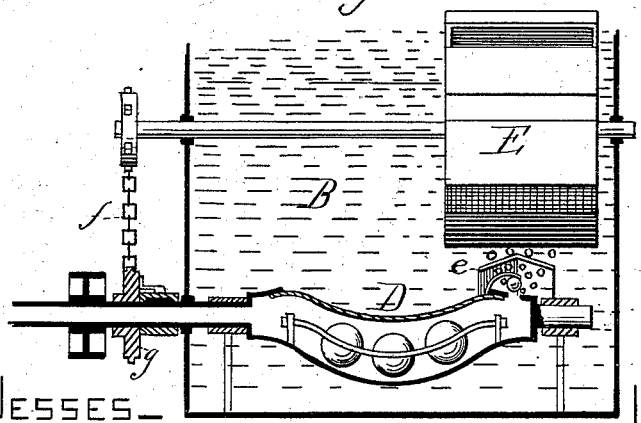
Witnesses
F. B. Townsend
F. W. Kasehagen.
Inventor
Wunibald R. Boerner.
by Lotz & Dyer,
Attys.

UNITED STATES PATENT OFFICE.

WUNIBALD R. BOERNER, OF CHICAGO, ILLINOIS.

AIR-COMPRESSOR.

SPECIFICATION forming part of Letters Patent No. 239,310, dated March 29, 1881.

Application filed August 23, 1880. (No model.)

*To all whom it may concern:*

Be it known that I, WUNIBALD R. BOERNER, of Chicago, in the county of Cook and State of Illinois, have invented a certain new and useful Improvement in Air-Compressors, of which the following is a specification.

The object I have in view is to produce apparatus for compressing air to be used as a motive power, which will be simple and effective, and will not require so much power as heretofore.

In the accompanying drawings, forming a part hereof, Figure 1 is a vertical section of the apparatus with the submerged air-pump and air-wheel in end elevation; and Fig. 2, a side elevation of the air pump and wheel, the pump being in section.

A is a stand-pipe of suitable height, to the bottom of which is connected a tank or reservoir, B, having preferably a dome-shaped top, *a*.

To the side of the air-reservoir B is connected, by two short pipes, the air-outlet pipe C, which leads to the air-engine. The pipe C rises above the reservoir, and has a suitable stop valve or cock, *b*. The outlet-pipe C also has a float-valve, *c*, which closes upwardly against the seat *d* when the water rises to that level, and prevents the water from passing off into the air-engine.

In the bottom of the air-reservoir B is located a submerged air-pump, D, upon which I have already applied for Letters Patent, and above the air-pump is an air-wheel or turbine, E, to the buckets or wings of which the air from the pump is directed by a suitable guide, *e*. The air-wheel is connected by a chain, *f*, with a sprocket-wheel, *g*, sleeved on the shaft of the air-pump, and connected therewith by a pawl and ratchet, so that the air-wheel will assist the movement of the pump, but cannot retard it. As will be readily understood, this air-wheel is operated by catching the rising air in its downwardly-turned buckets on one side of the wheel, such air displacing the water in the buckets and causing the wheel to revolve.

Now, it will be seen that the stand-pipe being filled partly or wholly with water, the air-reservoir will be also filled with water (except the dome-top) under pressure, and the pipe C will be filled up to the valve-seat *d*. Air being drawn in by the pump, it will be compressed, and, rising, will displace the water in the top of the reservoir B, turning the air-wheel in its passage upward. As the water is displaced in the top of the reservoir the float-valve will fall with it and open the pipe C, so that by means of stop-valve *b* the compressed air can be used as desired. As the compressed air is being used the water will continue to rise in the air-reservoir, always keeping the air under pressure until the float-valve closes against its seat.

The reservoir B may have a suitable pressure-gage, *h*, to show the compression of the air, and the pipe C may have an ordinary glass tube, *i*, connected therewith at both ends, to indicate the height of the water in the reservoir.

What I claim as my invention is—

1. In an air-compressor, the combination, with stand-pipe A and reservoir B, of the submerged air-pump in said reservoir, substantially as described and shown.

2. In an air-compressor, the combination, with stand-pipe A and reservoir B, of the submerged air-pump and the air-wheel, substantially as described and shown.

WUNIBALD R. BOERNER.

Witnesses:
F. W. KASEHAGEN,
H. A. BAUMANN.